April 12, 1966 T. L. McKAY ETAL 3,245,096
SELF-LOCKING SCREW
Original Filed Feb. 23, 1962 2 Sheets-Sheet 1
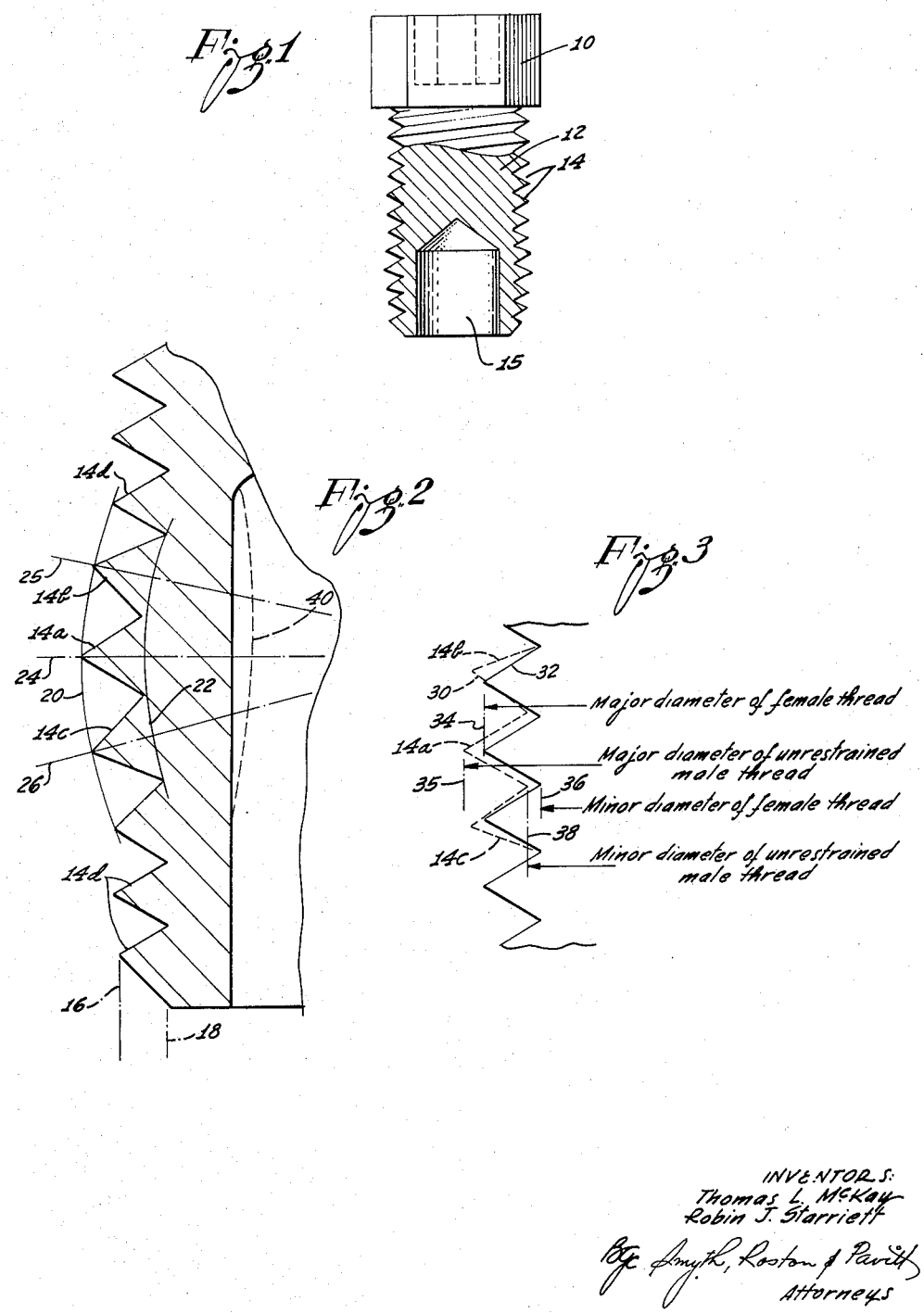
INVENTORS:
Thomas L. McKay
Robin J. Starriett
Smyth, Roston & Pavitt
Attorneys April 12, 1966 T. L. McKAY ETAL 3,245,096
SELF-LOCKING SCREW
Original Filed Feb. 23, 1962 2 Sheets-Sheet 2
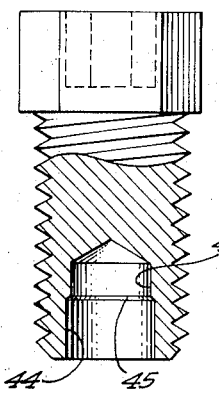
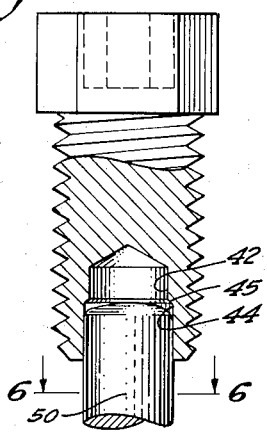
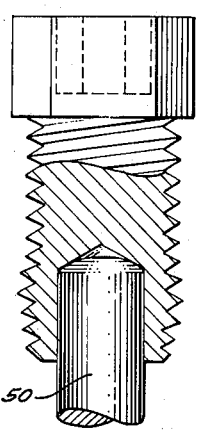
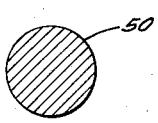
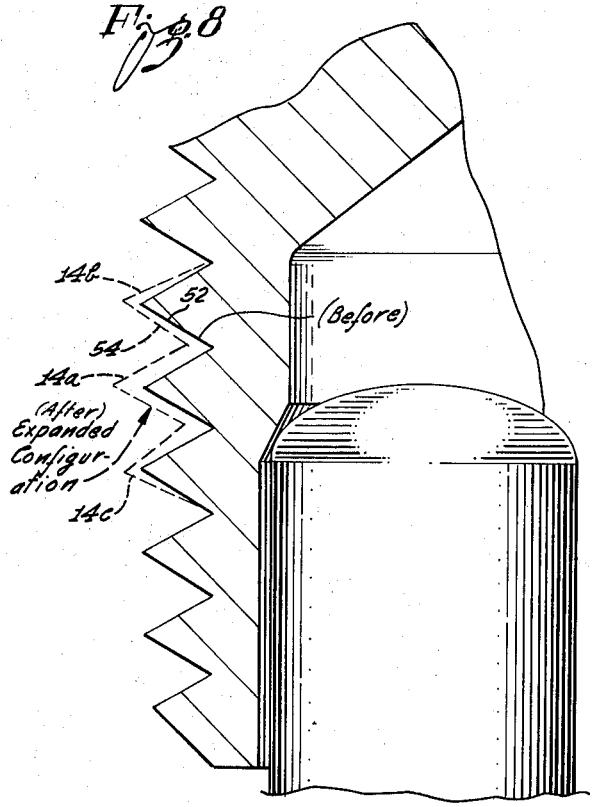
INVENTORS:
Thomas L. McKay
Robin J. Starriett
Attorneys

United States Patent Office 3,245,096
Patented Apr. 12, 1966

3,245,096
SELF-LOCKING SCREW
Thomas L. McKay, Los Angeles, and Robin J. Starriett, Woodland Hills, Calif., assignors to Long-Lok Corporation, Los Angeles, Calif., a corporation of California
Original application Feb. 23, 1962, Ser. No. 174,960, now Patent No. 3,212,547, dated Oct. 19, 1965. Divided and this application Mar. 15, 1965, Ser. No. 439,752
4 Claims. (Cl. 10—10)

This application is a division of copending application Serial No. 174,960 filed February 23, 1962, now Patent No. 3,212,547 and entitled "Self-Locking Screw."

This invention relates to a method of fabricating a self-locking screw and is directed to the problem of constructing such a screw to meet a certain set of specific requirements.

The basic requirement to which the invention is directed is to fabricate a screw that can achieve a reliable self-locking action. A high degree of reliability requires substantial resistance to loosening action under all conditions. It has been found that to make the self-locking function of a screw reliable under all conditions, elastic action must be provided to resist the effects of vibration.

A second requirement for the invention is the ability to withstand high temperatures and the ability to maintain an effective degree of torque resistance at high temperatures. This requirement rules out the use of low melting materials for the self-locking action.

A third capability to be sought is that the screw maintain its self-locking function when reused repeatedly. It has been found that to make reuse possible, the self-locking screw must not gall, must not freeze tight and must not mutilate the female thread that the screw engages. For a screw to maintain its self-locking efficiency when reused numerous times, say 20 to 30 times, here again it has been found that some kind of elasticity or spring action is required, the material of the screw yielding under stress to provide the locking action but doing so within the elastic limits of the material.

In many instances, the self-locking function of a screw is highly effective under simple shear loads, but the torque resistance drops to an unacceptable degree when the screw is simultaneously placed under heavy tension. Another requirement, therefore, is that the screw maintain a high percentage of its locking efficiency under heavy tension loading.

A further requirement of great importance in some fabrication procedures is that the threaded shank of the screw be free from burrs. In many instances, the added processing that is necessary to insure complete removal of burrs results in excessive cost.

A still further requirement is that the self-locking provision does not prevent easy entry of the screw into a cooperating threaded member. In some types of screws, the self-locking action mutilates the leading end of the screw thread making re-entry difficult.

A self-locking screw of the present invention is also constructed to meet the requirement of maximum strength in the shank of the screw in the region adjacent the head of the screw and for a substantial axial distance from the head. To resist high shear loads, for example, where the screw interconnects two plates that are subjected to opposite forces in their planes, the portion of the shank of the screw that is stressed in shear should be solid metal with no bores or recesses.

A final requirement to be met by the invention is that the self-locking feature does not require critical dimensioning. Here again, resilient yieldability is important. The inescapable conclusion is that any screw that will meet the whole list of requirements must use the equivalent of a spring action for the self-locking function.

Numerous self-locking screws are available to meet any one of the listed requirements, but as requirement is added to requirement to complete the list, fewer screws qualify. For example, screws employing plastic inserts of resilient character are highly satisfactory for most purposes but are ruled out on two counts. In the first place, no plastic material can compete with metals for withstanding high temperatures and, in the second place, cutting a slot, recess, radial bore or the like in the peripheral surface of a screw to receive a plastic insert creates the troublesome burr problem.

The burr problem becomes acute when a screw is longitudinally or otherwise split and is then spread or otherwise deformed for torque resistance under high temperature conditions. The edges along the split of such a screw undesirably function as cutting edges to mutilate the female thread that the screw engages. A further disadvantage is that splitting the shank anywhere but on the leading end weakens the resistance of the shank to shear loads and splitting the leading end of the screw creates entry and re-entry difficulties.

One attempt to meet all of the listed requirements has been to form a solid screw that is slightly enlarged in a short longitudinal region to create interference with the female thread that the screw engages. In one prior art screw, for example, the screw thread is formed by a rolling operation with the use of a special die which maintains the minor diameter, i.e., the root diameter, of the screw thread constant and maintains the major diameter constant except for three enlarged turns of the screw thread. One of the three turns of the screw thread is enlarged in major diameter and this turn is flanked by the other two turns that are enlarged in major diameter to lesser degree. The basic difficulty here is that the solid metal of the screw is unyielding. Dimensions are critical and the self-locking action is accomplished by the screw galling and freezing with consequent severe mutilation of the cooperating female thread. Once such a screw is installed, it cannot be removed and again replaced and tightened with acceptable locking action.

Another approach to the problem presented by the listed requirements is to provide an axial bore in the head of the screw and then to apply a suitable tool to the bore to expand the screw diametrically. The axial bore is counterbored to form a tapered inner circumferential shoulder and then a non-circular mandrel of greater cross dimension than the axial bore but of less cross dimension than the counter bore is inserted to forcibly expand the portion of the bore beyond the counterbore. The expansion occurs in diametrically opposite directions and the result is a self-locking screw that is somewhat oval or elliptical in cross sectional configuration.

One disadvantage that disqualifies this prior art screw is that the axial bore through the head end of the screw greatly weakens the region of the shank adjacent the head where maximum strength is often required to meet heavy shear loads. Another serious disadvantage is that the self-locking action is diametrical rather than uniform around the circumference of the screw. In addition, it has been found that when such a screw is placed under high tension, its torque resistance drops off to an unacceptable degree. A basic difficulty, moreover, is that the screw does not provide adequate spring action for the self-locking function.

The method of the present invention solves all of these problems by providing an axial bore in the leading end of the screw, not the head end, the axial bore stopping far short of the head to leave solid material for maximum shear resistance in the shank in the region of the head. The axial bore is counterbored to receive a solid mandrel of circular cross section which is effective to enlarge the portion of the screw beyond the counterbore with the screw expanding uniformly in all radial directions. The local region of the screw is expanded in inside and outside diameter beyond the elastic limits of the metal to give a permanent set to the enlargement, but the inherent elasticity of the selected metal is sufficient to provide the essential resiliency for spring action at the expanded configuration of the screw.

The enlargement of the screw uniformly around its circumference results in a bulbous local configuration, the longitudinal radial section of which is of the configuration of an arch, the arch bowing outward sufficiently to create interference with the cooperating female thread that is engaged by the installed screw. The self-locking action may be further understood when it is considered that the bored portion of the screw shank that is enlarged is similar to a bellows in configuration, the bellows being bulged outward.

In the particular embodiment of the inventive method selected for the present disclosure, the expansion step in the fabrication procedure affects primarily three successive turns of the male thread, one turn being displaced radially outward to the maximum and this one turn being flanked by two turns which are displaced outward to lesser extent. The two flanking turns, moreover, are also cocked or tilted in opposite directions, both leaning away from the intermediate turn of the screw thread.

When the screw is inserted into the threaded bore of a cooperating member, the fact that the major diameter of the female thread of the cooperating member is less than the major diameter of the bulged portion of the male thread results in forced radial contraction of the expanded portion of the screw, the range of radial contraction being within or largely within the elastic limits of the metal of the screw. The flattening in profile of the bulged portion of the threaded shank also results in shortening of the bulged portion and contraction in the spacing of the turns of the screw thread that are on the bulged portion. In addition the surrounding female thread that contracts the bulged portion of the screw encounters the two tilted turns of the screw thread and forcibly reduces their tilt to an appreciable degree.

All of these effects on the bulged portion of the screw by the surrounding female screw thread are largely resilient effects within the elastic limits of the material of the screw. This fact may be easily demonstrated by a procedure that will be explained later. It is this spring action that makes it possible to re-use a screw many times with sustained self-locking action. The resiliency or spring action also enables the screw to maintain a high percentage of its torque resistance when the screw is placed under a heavy tension load. It has been found that the spring action requires that the tubular wall of the screw be expanded uniformly around its circumference, the bulged portion being substantially circular in cross section throughout its length.

The features and advantages of the invention may be understood from the following detailed description and the accompanying drawings.

In the drawings, which are to be regarded as merely illustrative:

FIGURE 1 is a view partly in elevation and partly in section illustrating a selected embodiment of the invention;

FIGURE 2 is a greatly enlarged fragment of FIGURE 1;

FIGURE 3 is a diagram showing the configuration of the male thread in FIGURE 2 and the configuration of the female thread of a cooperating threaded member such as a nut which is to be engaged by the screw;

FIGURE 4 is a view similar to FIGURE 1 illustrating the first steps in the procedure of fabricating the self-locking screw;

FIGURE 5 illustrates how preparation for the next step may be made by partially inserting a mandrel into the partially processed screw;

FIGURE 6 is a section taken on the line 6—6 of FIGURE 5 showing the circular cross section of the mandrel;

FIGURE 7 is a view similar to FIGURE 5 illustrating the completion of the step of forcing the mandrel into the axial bore of the screw for the purpose of uniformly radially expanding the screw; and FIGURE 8 is a diagrammatic view showing the configuration of the thread of the screw before and after the expansion operation.

The embodiment of the invention selected for the present disclosure is a self-locking cap screw of the configuration shown in FIGURE 1. The cap screw has a hexagonal head 10 and has a shank 12 that is formed with an external screw thread 14. The self-locking cap screw is further characterized by an axial bore 15 in the leading end of the screw. It is to be noted that the axial bore 15 terminates far short of the hexagonal head 10 so that a substantial longitudinal portion of the shank 12 adjacent the hexagonal head is made of solid metal for maximum shear strength.

The self-locking feature of the cap screw may be understood by referring to FIGURES 2 and 3. FIGURE 2 shows how a portion of the shank of the screw is formed with a bulbous enlargement involving a turn 14a of the screw thread 14 and two turns 14b and 14c that flank the turn 14a. The remaining turns of the screw thread 14 including the turns 14d at the leading end of the screw are uniform with a major diameter or crest diameter 16 and a minor diameter or root diameter 18.

As viewed in radial section in FIGURE 2, the tubular wall of the screw in the region of the turns 14a, 14b and 14c is arched outward with consequent spreading apart of the crest of the turns. The major diameters of the three turns 14a, 14b and 14c of the screw thread 14 conform to the curved line 20 and in like manner the minor diameters of the three turns conform to the curved line 22. In addition, it is to be noted that the two turns 14b and 14c of the screw thread are inclined in opposite directions away from the turn 14a. Thus as seen in section the turn 14a points straight outward in the direction indicated by the line 24, whereas the two turns 14b and 14c are directed outwardly in divergent directions as indicated by the lines 25 and 26 respectively. Thus, the spacing of the crest of the turn 14a from the crests of the turns 14b and 14c is greater than the spacing between the successive crests of the rest of the turns of the screw thread 14.

In FIGURE 3 the broken line 30 indicates the profile of the screw thread 14 in the region of the three expanded turns 14a, 14b and 14c. The second solid line 32 represents the profile of the female thread of a cooperating member such as a nut or a body having a tapped bore with which the screw is to be engaged in a self-locking manner. It may be seen in FIGURE 3 that the major diameter of the female thread that is indicated by the line 34 is appreciably less than the major diameter of the screw thread 14a that is indicated by the line 35. In like manner, the minor diameter 36 of the female screw thread 32 is less than the minor diameter 38 of the male thread measured on opposite sides of the turn 14a.

It is apparent from FIGURE 3 that engagement of the enlarged portion of the cap screw with the cooperating female screw thread represented by the profile 32 requires that the arch represented by the lines 20 and 22 in FIGURE 2 be flattened to an appreciable degree and it is further apparent that for the male thread to mesh with the turns of the female thread the two tilted turns 14b and 14c must be reduced in tilt to appreciable degree. Both of these actions, i.e., the flattening of the arched configuration and the reduction in tilt of the two turns 14b and 14c create pressure between the two threads to provide the desired frictional self-locking action.

It is further apparent that the forced contraction in outside diameter of the enlarged portion of the cap screw must result in inward deflection of the tubular wall of the cap screw as indicated by the dotted line 40 in FIGURE 2. The flattening or partial flattening of the arch represented by the lines 20 and 22 also means that the arch must be shortened since a straight line is shorter than a curved line.

Actually the tubular portion of the cap screw is similar to a bellows that is locally enlarged in diameter. If the enlarged portion of the bellows is forcibly contracted in diameter, the enlarged ribs of the bellows are not only contracted somewhat in diameter in the course of the self-locking action but are also crowded together.

It has been found that if a tubular portion of a cap screw of the character described is radially enlarged uniformly around its circumference in a local region encompassing a few turns of the screw thread, the tubular wall of the cap screw will exhibit appreciable resiliency to provide the previously discussed spring action that is a basic requirement. It is because the tubular wall is resiliently contracted by a nut or other cooperating member that the tubular portion of the cap screw expands again when the cap screw is disengaged from the cooperating member, the re-expanded cap screw being capable of self-locking action when again engaged with a cooperating member. Thus, the forcible contraction of the enlarged portion of the cap screw by a cooperating nut is within or substantially within the elastic limits of the metal of the cap screw.

The described resiliency or spring action that is involved in the self-locking function may be easily demonstrated. To carry out the demonstration, a cap screw of high carbon steel of the character shown in FIGURE 1 is screwed into a cooperating nut having a female screw thread of the configuration and relative dimensions indicated by the line 32 in FIGURE 3. Before the cap screw is engaged with the nut, a mandrel of circular cross section is inserted into the expanded bore 15, the diameter of the mandrel being selected for a snug but easy sliding fit. When the nut is screwed into the cap screw, it is found that the cap screw contracts radially to grip the mandrel effectively and creates high resistance to withdrawal of the mandrel. When the nut is subsequently removed from the cap screw, however, the mandrel is released and may be readily withdrawn. The fact that the cap screw may be re-used repeatedly with effective self-locking action may be shown by repeating this demonstration for thirty or more times, the mandrel being gripped each time the nut is applied to the cap screw and being released each time the nut is removed from the cap screw.

FIGURES 4–8 illustrate a preferred method of fabricating the cap screw that is shown in FIGURE 1. The first step is to bore and counterbore a conventional cap screw in the manner shown in FIGURE 4 where the bore is indicated at 42 and the counterbore is indicated at 44. Since the counterboring is accomplished by means of a conventional drill, the counterboring forms a tapered inner circumferential shoulder 45 in the interior of the cap screw. The diameter of the counterbore 44 may, for example, be .010 to .15 inch larger than the diameter of the bore 42.

The next step in the fabrication procedure is to insert a mandrel 50 into the interior of the counterbored cap screw against the tapered shoulder 45 as indicated in FIGURE 5, the mandrel being of the circular cross section shown in FIGURE 6. The mandrel 50 is of a diameter to fit snugly into the counterbore 44. The final step is to advance the mandrel 50 forcibly into the bore 42 in the manner shown in FIGURE 7 and then to withdraw the mandrel. The effect of the mandrel 50 in forming the enlargement is indicated graphically in FIGURE 8 where the line 52 indicates the profile of the screw thread 14 before the expansion of the metal by the mandrel and the line 54 indicates the profile of the screw thread after the expansion of the metal. The profile 54 is the same as the profile shown in FIGURE 2.

An unexpected advantage afforded by the invention is that the engagement of the male thread of the screw with the surrounding female thread of the bore in which the screw is inserted provides a fluid-tight seal. This sealing action may be understood when it is considered that the two oppositely inclined turns of the male threads oppose each other in their frictional engagement with corresponding turns of the female thread and thus create sealing pressure along the areas of frictional engagement. This sealing action has special utility when a tapped bore in a metal casting penetrates a porous region of the body and thus creates a potential leakage path.

Our description in specific detail of the selected embodiment of the invention, by way of example, will indicate various changes, substitutions and other departures from our disclosure within the spirit and scope of the appended claims. For example, any number of successive turns of the male thread of the screw may be expanded. It is also to be noted that the screw may be enlarged in any selected region along the tubular portion of the screw.

What is claimed is:

1. A method of fabricating a self-locking screw characterized by the steps of:
   providing an axial bore in the leading end of the screw and further providing a counterbore at an intermediate point on the length of the threaded portion of the screw to make the leading end of the screw tubular with an inner circumferential shoulder forming a transition from a given inside diameter at the leading end of the screw to a lesser diameter,
   inserting a mandrel of substantially circular cross-section into the leading end of the screw against said shoulder, the diameter of the mandrel being slightly less than said given diameter but greater than said reduced diameter,
   forcibly advancing the mandrel into the interior of the screw past said shoulder for local expansion of the threaded portion of the screw in the region of said reduced diameter and consequently tilting of at least one turn of the screw thread for self-locking action of the screw, and
   withdrawing the mandrel.

2. A method of fabricating a self-locking screw characterized by the steps of:
   forming the screw of tubular configuration with the leading end of the screw open and with a shoulder formed inside the screw by a transition from a given inside diameter at the leading end of the screw to a lesser inside diameter at a point spaced substantially inward from the leading end,
   inserting a mandrel of substantially circular cross-section into the leading end of the screw against said shoulder, the diameter of the mandrel being slightly less than said given inside diameter but greater than said lesser inside diameter,
   forcibly advancing the mandrel into the interior of the screw past said shoulder for local expansion of the screw in the region of said shoulder, and
   withdrawing the mandrel.

3. A method as set forth in claim 1 in which the mandrel is forcibly advanced to substantially the inner end of the axial bore.

4. A method as set forth in claim 1 in which the boring step and the counterboring step are controlled to make the lesser inside diameter of the screw extend over a distance of approximately three turns of the screw thread; and
 in which the mandrel is forced to substantially the inner end of the bore to expand the three turns of the screw thread.

References Cited by the Examiner

UNITED STATES PATENTS

| | | | |
|---|---|---|---|
| 2,856,617 | 10/1958 | Widmann | 10—10 |
| 3,145,750 | 8/1964 | Wootton | 151—14 |

WILLIAM W. DYER, Jr., *Primary Examiner.*

F. T. YOST, *Assistant Examiner.*